(12) United States Patent
Little

(10) Patent No.: US 10,399,639 B2
(45) Date of Patent: Sep. 3, 2019

(54) BOAT HULL

(71) Applicant: Anthony Little, Campbell (AU)

(72) Inventor: Anthony Little, Campbell (AU)

(73) Assignee: ECOSEA PTY LTD., Campbell Act (AU)

( * ) Notice: Subject to any disclaimer, the term of this patent is extended or adjusted under 35 U.S.C. 154(b) by 0 days.

(21) Appl. No.: 15/579,163

(22) PCT Filed: Jun. 4, 2015

(86) PCT No.: PCT/AU2015/050308
§ 371 (c)(1),
(2) Date: Dec. 1, 2017

(87) PCT Pub. No.: WO2015/184508
PCT Pub. Date: Dec. 10, 2015

(65) Prior Publication Data
US 2018/0170484 A1    Jun. 21, 2018

(51) Int. Cl.
| | |
|---|---|
| *B63B 1/08* | (2006.01) |
| *B63B 1/20* | (2006.01) |
| *B63B 1/06* | (2006.01) |
| *B63B 1/22* | (2006.01) |
| *B63B 1/32* | (2006.01) |
| *B63B 1/40* | (2006.01) |

(52) U.S. Cl.
CPC .................. *B63B 1/22* (2013.01); *B63B 1/08* (2013.01); *B63B 1/32* (2013.01); *B63B 1/40* (2013.01); *B63B 2001/201* (2013.01); *Y02T 70/12* (2013.01); *Y02T 70/128* (2013.01)

(58) Field of Classification Search
CPC .... B63B 1/22; B63B 1/40; B63B 1/08; B63B 1/32; B63B 2001/201; B63B 1/06; B63B 1/20; Y02T 70/128; Y02T 70/12
USPC ........................................................ 114/291
See application file for complete search history.

(56) References Cited

U.S. PATENT DOCUMENTS

| | | |
|---|---|---|
| 1,081,489 A | 12/1913 | Currie |
| 1,296,155 A | 3/1919 | Bazaine |

(Continued)

FOREIGN PATENT DOCUMENTS

| | | |
|---|---|---|
| GB | 478695 A | 1/1938 |
| GB | 1014698 A | 12/1965 |

(Continued)

OTHER PUBLICATIONS

Australian Patent Office, International-Type Search Report Issued in Australian Application No. 2017902519, dated Jul. 28, 2017, 8 pages.

*Primary Examiner* — Anthony D Wiest
(74) *Attorney, Agent, or Firm* — Alleman Hall Creasman & Tuttle LLP

(57) ABSTRACT

A boat hull, comprising a plurality of chines extending downwardly from a bow of the hull towards a stern of the hull, each chine in transverse cross section being substantially straight and substantially horizontal and arranged so that a centerline of each chine lies in a plane which is parallel to a central plane of an adjacent chine, wherein collectively the chines in a lower forward portion of the hull are arranged generally V shaped in cross section and wherein an aft portion of a base of the hull is generally flat and each chine terminates at the flat aft portion.

15 Claims, 8 Drawing Sheets

(56) References Cited

U.S. PATENT DOCUMENTS

| | | | | |
|---|---|---|---|---|
| 1,935,622 | A * | 11/1933 | Eddy | B63B 1/20 |
| | | | | 114/271 |
| 2,044,771 | A * | 6/1936 | Carr, Jr. | B63B 1/20 |
| | | | | 114/290 |
| 3,113,543 | A | 12/1963 | Brownback | |
| 3,226,739 | A | 1/1966 | Noe | |
| 3,259,092 | A | 7/1966 | Kara, Jr. | |
| 4,316,721 | A * | 2/1982 | Weiss | B63H 11/04 |
| | | | | 239/265.19 |
| 4,453,489 | A * | 6/1984 | Charlins | B63B 1/20 |
| | | | | 114/288 |
| 5,016,552 | A | 5/1991 | Ludlow | |
| 5,509,832 | A * | 4/1996 | Roos | B63H 11/01 |
| | | | | 440/38 |
| 5,526,762 | A | 6/1996 | Kiley | |
| 6,604,478 | B2 * | 8/2003 | Barsumian | B60V 1/08 |
| | | | | 114/289 |
| 6,708,642 | B1 | 3/2004 | Taylor | |
| 6,773,316 | B1 | 8/2004 | Keehn, Jr. | |
| 2005/0087120 | A1 | 4/2005 | Kalil | |
| 2008/0210150 | A1 | 9/2008 | Loui et al. | |
| 2012/0291686 | A1 | 11/2012 | Loui et al. | |

FOREIGN PATENT DOCUMENTS

| | | | |
|---|---|---|---|
| GB | 1199658 A | 7/1970 | |
| GB | 2235418 A | 3/1991 | |

\* cited by examiner

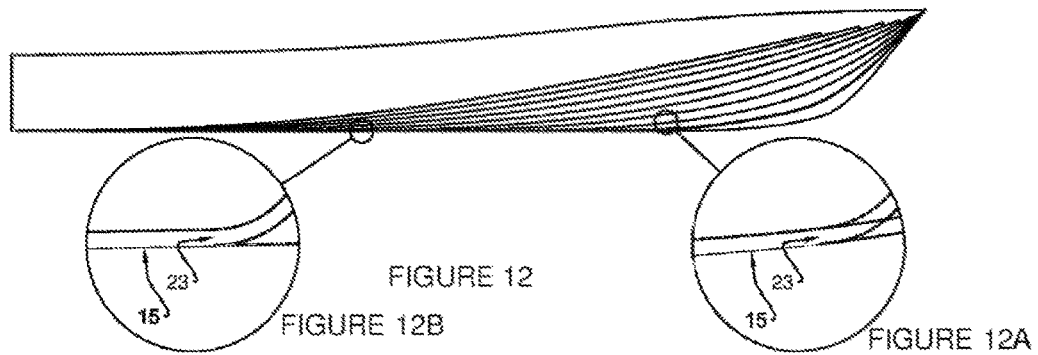
FIGURE 12
FIGURE 12B          FIGURE 12A
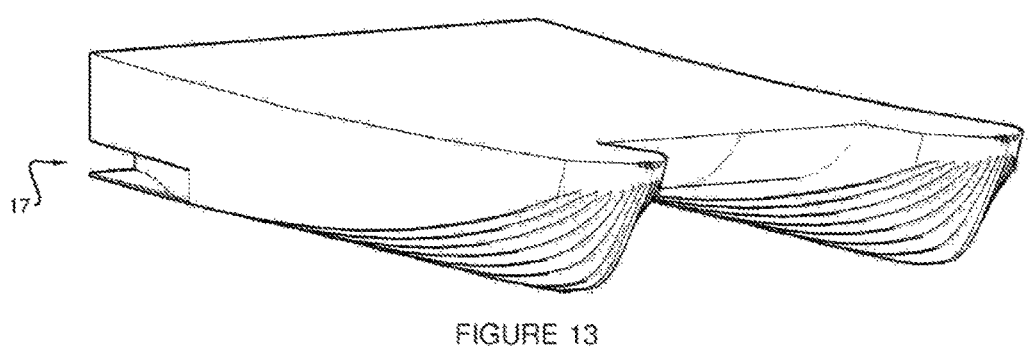
FIGURE 13
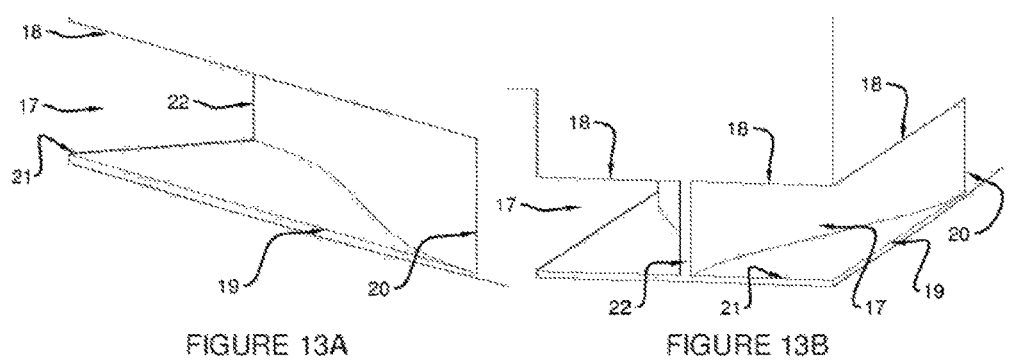
FIGURE 13A          FIGURE 13B
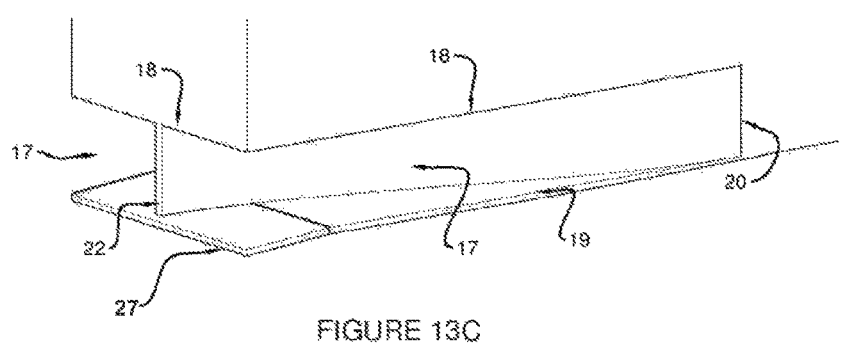
FIGURE 13C

BOAT HULL

This application is a national phase of International Application Serial No. PCT/AU2015/050308, entitled BOAT HULL, filed Jun. 4, 2015, the entire disclosure of which is incorporated by reference for all purposes.

FIELD OF THE INVENTION

The present invention relates to a boat hull. More generally, the present invention relates to improvements to the hydrodynamic efficiency of boat hulls, floats, sponsons or similar, designed to operate in light and/or heavy weather conditions. In addition, the invention relates to, among other things, improvements in seaworthiness, structural integrity and buildability of the aforementioned referred to hereafter as a 'boat hull' or 'hull'.

BACKGROUND OF THE INVENTION

Traditional boat hull design has evolved over many years with each new design being a development of existing accepted concepts. Traditionally, fast displacement and planing boat hull designs are based on an immersed hull form travelling through the water where the 'V' hull form for high speed vessels is accepted as being the optimum hull form for a variety of sea states. Designers constantly face challenges related to the 'V' hull form where each design attribute presents inherent compromises between that attribute and one or more others.

For example, a hull having a narrow entry will provide reduced form resistance and subsequently be able to travel faster through the water. The compromise being that the narrow bow generates less lift, has less volume, and subsequently less buoyancy, and therefore carries less payload and can have a tendency to submarine through swells. To counter this, designers incorporate a flared bow section. The introduction of the flared bow does not increase payload but introduces additional internal volume high up in the bow, and subsequently provides exponential reserve buoyancy in the bow to provide a hull form that is intended to ride over a swell. The flared bow also increases deck area and helps prevent excessive amounts of water washing across the deck, producing a 'drier' boat. The compromise with this form is that when the bow buries into a large swell, the hull presents a relatively blunt form to the swell which increases wave-making resistance and partially stalls the vessel's forward motion.

With regard to planing vessels, it is accepted that the easiest way to get a vessel to plane is to provide a hull with a flat underbody. The compromise with a flat underbody is that the vessel is only suited to flat water operation due to poor performance and excessive slamming loads in rough water. In addition, a planing hull requires design attributes to promote lift which is essential for the hull to transition from displacement mode to planing mode and to continue to operate in planing mode.

The reduction of slamming loads and generation of lift is generally achieved with conventional hulls by the incorporation of 'V transverse sections below the waterline. With constant deadrise hulls, the 'V is constant along the length of the vessel which often results in a compromise between accommodating slamming loads at the bow and providing optimum planing performance. Variable deadrise hulls generally transition from a deep, fine 'V forward, to a flatter 'V aft. The fine 'V forward section reduces slamming loads but also reduces the lift required for the vessel to transition from displacement mode to planing mode. The flatter 'V sections aft provide the planing surface. For operation, essentially, the application of power 'squeezes' the bow out of the water, inclining the hull to allow it to be driven out of the water and onto the plane. This squeezing motion propagates equal and opposite forces on both sides of the hull as evidenced by the bow wave, and is representative of the wave-making resistance of the bow portion of the hull. These wavemaking forces constitute large energy losses.

The aft 'V planing surfaces of a planing vessel provide the planing area required for the hull to 'ride' on the water when operating in planing mode. These planing surfaces must maintain an incline in the direction of travel to produce the lift required to stay 'on the plane'. The combination of the incline and the 'V hull form propagates an outflow of water from under the hull, as the vessel travels forward, displacing large volumes of water from under the hull. Consequently, the inclined bow buries the stern, creating a void in the water immediately aft of the hull as a result of water being displaced by the vessels motion. This void is evidence of large energy losses.

The incline also increases the propulsion thrust line angle from the horizontal, which reduces the efficiency of the vessel as a whole. Inclined planing vessels also present a relatively broad slamming area to the face of oncoming swells further reducing efficiency, reducing comfort and introducing unnecessary slamming loads and stresses to the vessel.

Planing hull designs, having broad planing aft sections, vary greatly in design from displacement hulls, having diminishing displacement aft, and operate most effectively at the speeds for which they were designed. Displacement hulls by design cannot operate as a planing vessel. However, a planing hull will operate in displacement mode at low speed which is a compromise of the design intent as it operates with a buried stern resulting in increased eddy-making resistance and reduced efficiency.

In addition to the water being displaced by the hull form, water is also displaced by the propulsion system through propellers, water jets or similar. Displacing or relocating water consumes energy, therefore the lower the volume of displaced water and the shorter the displacement distance, the lower the energy required.

In addition to the above, frictional resistance, which is approximately proportionate to the wetted surface area, is inherent in all hulls immersed in water while travelling through it. A reduction in wetted surface area is one of the main focuses of hull designers in an effort to reduce frictional resistance which is one of the greatest contributors to energy losses in boat hulls. To this end, attempts have been made to introduce air bubbles and air films between the hull and the surface of the water with limited practical success.

It is also highly desirable to have a shallow draft vessel to access remote areas especially when running for cover in heavy weather where shallow water may be the only safe refuge. The nature of a 'V hull is that they are immersed deeper into the water which exposes the underside of the hull and running gear to potential collisions with the bottom.

Preferred embodiments of the present invention seek to overcome or ameliorate one or more of the above mentioned challenges, or at least provide a useful alternative.

SUMMARY OF THE INVENTION

According to one aspect of the present invention, there is provided a boat hull, comprising a plurality of chines extending downwardly from a bow of the hull towards a stern of the hull, each chine in transverse cross section being substantially straight and substantially horizontal and arranged so that a centreline of each chine lies in a plane which is parallel to a central plane of an adjacent chine, wherein collectively the chines in a lower forward portion of the hull are arranged generally V shaped in cross section and wherein an aft portion of a base of the hull is generally flat and each chine terminates at the flat aft portion.

According to another aspect of the present invention, there is provided a boat hull, comprising a plurality of chines extending downwardly from a bow of the hull towards a stern of the hull, each chine being, at least at a forward portion thereof, in transverse cross section substantially straight and inclined toward a central longitudinal plane of the hull and arranged so that a centreline of each chine lies in a plane which is parallel to a central plane of an adjacent chine, wherein collectively the chines in a lower forward portion of the hull are arranged generally V shaped in cross section and wherein an aft portion of a base of the hull is generally flat and each chine terminates at the flat aft portion.

According to the second aspect, the chines may transition from being inclined towards the central longitudinal plane at the bow to horizontal at an aft end of the chine.

According to a preferred embodiment, a vertical separation of the chines varies along a length of the chines to allow the chines to transition from being generally converged towards the bow through greater offset sections at mid bow to merge with a generally flat underbody. Preferably, the chines curve downwardly toward the base. Preferably, a substantially vertical surface is disposed between adjacent chines.

According to a preferred embodiment, the forward sections of the chines may be trimmed at an intersection with a topside of the bow, and preferably by an inward curve of the bow topsides, thus terminating the convergence of the chines at the bow.

According to a preferred embodiment, an aft portion of a base of the hull is generally flat and each chine terminates at the flat aft portion. Preferably, the flat aft portion narrows toward a forward end.

The boat hull can further comprise at least one pair of generally vertical ribs extending along and downwardly from an outboard edge of opposite chines.

The hull can further comprise at least one aperture formed in at least one of the chines and through which air or exhaust gases can flow from onto an operative surface of the chine and flat underbody, the aperture being disposed near a trailing end of the or each chine. Preferably, the aperture is in the form of a rear facing slot or substantially round hole. Preferably, the slot is configured to provide a sufficient pressure reduction to excite and maintain a venturi effect. The aperture configuration can also be configured as a low pressure injection point for air and/or exhaust gasses to be propelled through onto an operative surface of the chine and flat underbody.

According to another embodiment, the hull further comprises a channel formed in opposite side walls of the hull, the channels being configured to direct water inwardly from opposite sides of the hull to generally merge behind the stern. The merge section may accommodate a water jet outlet or a stern drive leg. Trim tabs extending from a lower rearward portion of the hull may be provided and incorporated into the flat planing surface. Trim tabs may be adjustable.

According to another embodiment, the hull further comprises an internal propulsion system for transferring displaced water from under the hull to a void in the water behind the hull. The internal propulsion system can include propellers or jets and an outlet which is adjustable in aperture size to vary or move the water acceleration point further aft at the restricted aperture location in response to speed changes as speed increases.

An aft end or merge point of the hull may further comprise an outlet of an internal propulsion system which provides the primary means of transferring displaced water from under the hull to the displacement void behind the hull.

According to another embodiment, the hull may include a longitudinal water intake for the transfer of displaced water from under the hull through an internal propulsion system.

According to another embodiment, the hull may include a plurality of flat bottom sections, including a lowermost central section or vertically disposed central hull section to provide additional vertical lift at the bow. The lowermost central section or vertically disposed central hull section transitions in width to reduce transverse pressure aft to draw displaced water under the hull. In this regard, the vertically disposed section can be tapered inwards in plan view from the aft end of the chines towards the stern.

The vertically disposed section may accommodate a water intake for a longitudinal internal propulsion system. The intake may be on each side of the longitudinal internal propulsion system to draw displaced water from under the hull and through the drive to minimise the distance the water is displaced. The vertically disposed section may, in plan view, have parallel sides or tapered sides.

The boat hull can further comprise the chines merging with a displacement hull form to dampen the oscillation of displacement hulls subject to ocean swells.

A central chine of the hull can be narrowest. Preferably, the bow is generally pointed. The hull can be symmetrical about a central longitudinal plane. Vessels with more than one hull can have asymmetrical hulls but be symmetrical about the centreline of the vessel. Preferably, the chines promote lift.

According to another aspect of the invention there is provided a boat hull, comprising a plurality of chines extending downwardly from a bow of the hull towards a stern of the hull, each chine in transverse cross section being substantially straight and substantially horizontal and arranged so that a centreline of each chine lies in a plane which is parallel to a central plane of an adjacent chine, wherein collectively the chines in a lower forward portion of the hull are arranged generally V shaped in cross section and a lower portion of the hull is in the form of a displacement hull that the chines merge into.

According to another aspect of the invention there is provided a boat having at least one hull of the above described type.

Preferred embodiments of the invention may provide a displacement, semi-displacement and/or planing boat hull suitable for low speed and high speed operation in light and heavy weather.

BRIEF DESCRIPTION OF THE DRAWINGS

Preferred embodiments of the invention will be further described, by way of non-limiting example only, with reference to the accompanying drawings in which:

FIGS. 9 A to 9E are sectional views of the boat hull of FIG. 9;

FIGS. 11 A to 11E are sectional views of the boat hull of FIG. 11;

FIGS. 12, 12A and 12B are side views of a boat hull of another embodiment;

FIG. 13 is a perspective view of a boat hull of another embodiment;

FIGS. 13A to 13C are close perspective views of the boat hull of FIG. 13;

DETAILED DESCRIPTION

Figure 1:
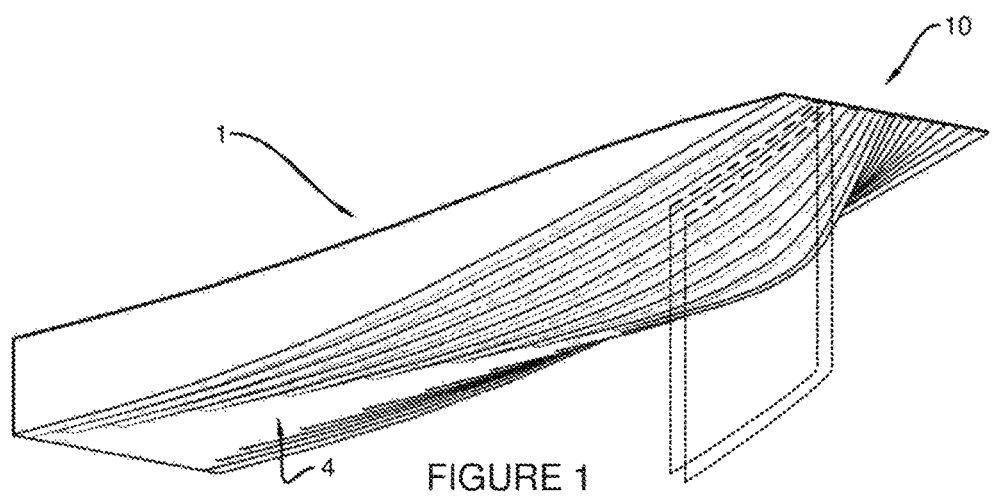
FIG. 1 is a perspective view of a boat hull of one embodiment of the invention.
Figure 4:
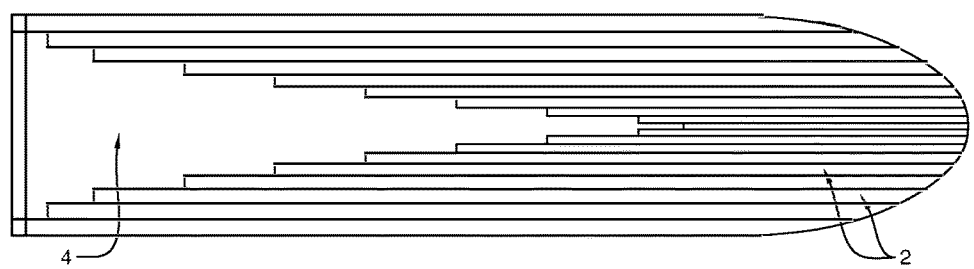
FIG. 4 is an underneath view of the boat hull of FIG. 2.
Figure 5:
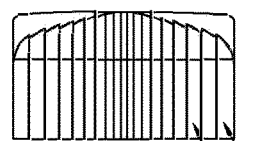
FIG. 5 is a front view of the boat hull of FIG. 2.
Figure 9:
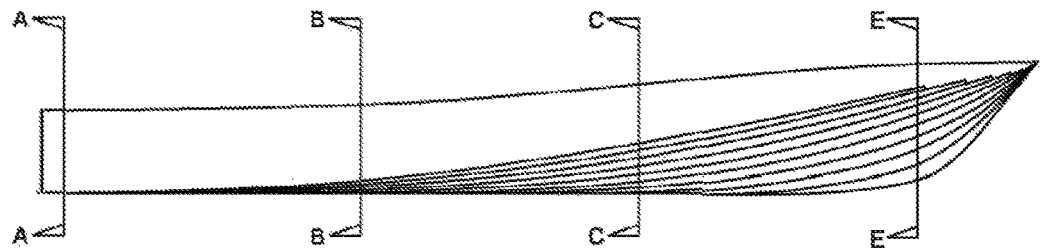
FIG. 9 is a side view of a boat hull of one embodiment.
Figure 9A:
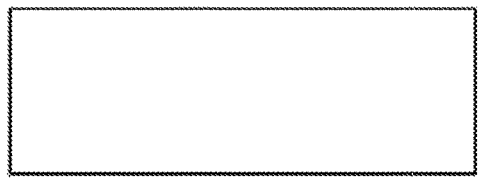
Figure 9B:
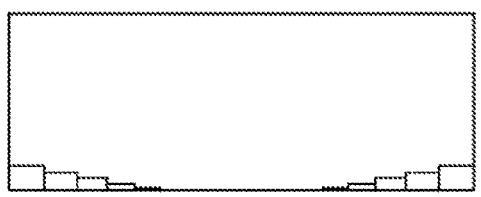
Figure 9C:
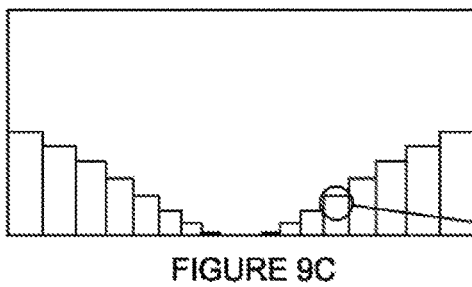
Figure 9D:
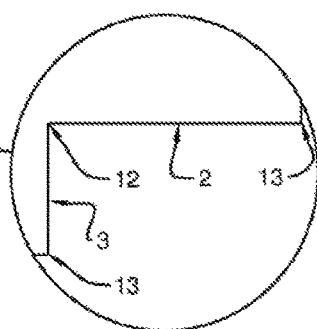

With reference to FIG. 1, there is shown a boat hull 1 according to a preferred embodiment of the invention. The boat hull 1 comprises a plurality of chines 2 extending downwardly from a bow 10 of the hull 1 towards a stern 7 or a base 4 of the hull 1. Each chine 2 is, in transverse cross section, substantially straight and substantially horizontal, as can be seen in FIG. 9D. Each chine 2 is also arranged so that a centreline or a line along the centre of the outer surface of the chine 2 lies in a plane which is parallel to a central plane of an adjacent chine 2, i.e. the adjacent chine is also configured so that a centreline of the chine lies in a plane, as indicated by exemplary dashed line planes in FIG. 1 and exemplary dashed centrelines in FIG. 9E. Accordingly, although the chines 2 are inclined and offset from each other, in an underneath view, as illustrated in FIG. 4, the chines 2 appear parallel.

Figure 2:
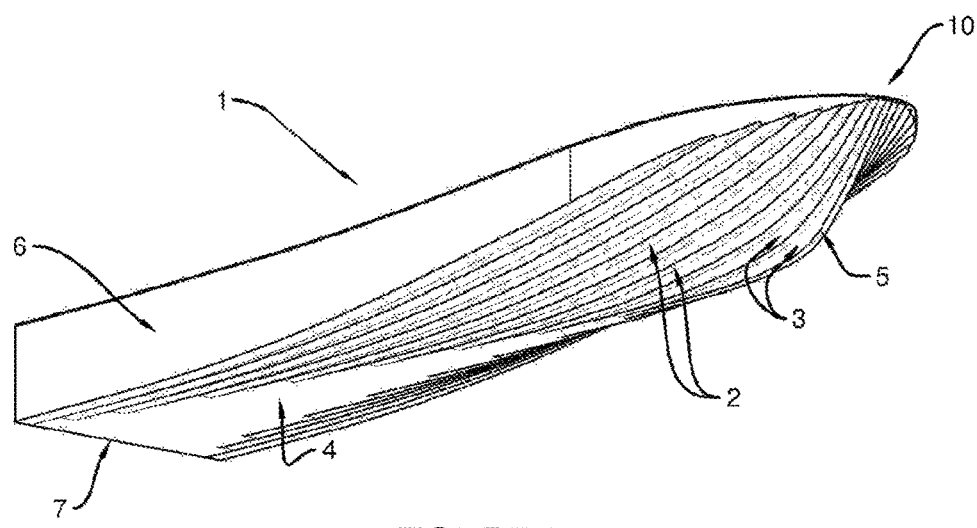
FIG. 2 is a perspective view of a boat hull of another embodiment.
Figure 7:
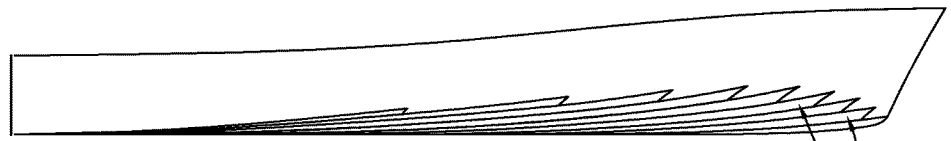
FIG. 7 is a side view of a boat hull of another embodiment, the boat hull being configured for use in protected waters or light weather with the forward sections of the chines trimmed by the curve of the bow topsides.

As can be seen in FIG. 9D, a substantially vertical surface 3 is disposed between adjacent chines 2. The vertical surface 3 allows the chines to be offset from each other without providing a deflection surface that directs water outwardly to create a bow wave. The vertical surfaces 3 vary in height along their lengths, to allow the chines 2 to transition from a generally pointed bow 10 through the greatest offset sections at mid bow 5 (FIG. 2) where slamming loads are minimised, to a generally flat underbody 4. The forward end of the chines may be trimmed by the intersection of an inward curvature of topsides 6, as shown in FIG. 7, thus terminating the convergence of the chines at the bow.

Figure 9E:
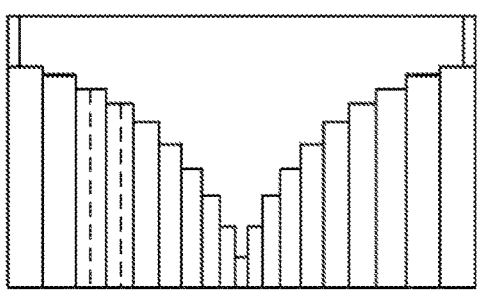
Figure 10:
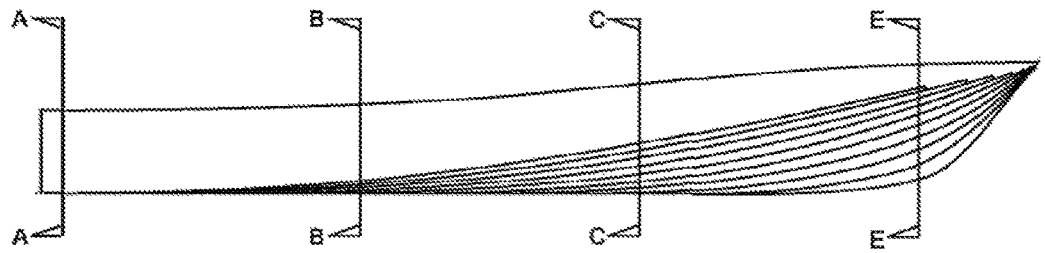
FIG. 10 is a side view of a boat hull or another embodiment.
Figure 10A:
FIGS. 10A to 10E are sectional views of the boat hull of FIG. 10.
Figure 10B:
Figure 10C:
Figure 10D:
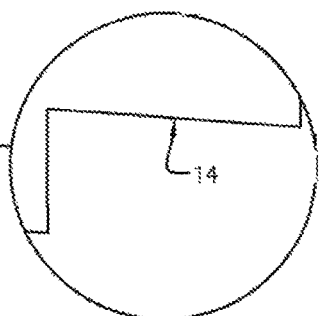
Figure 10E:
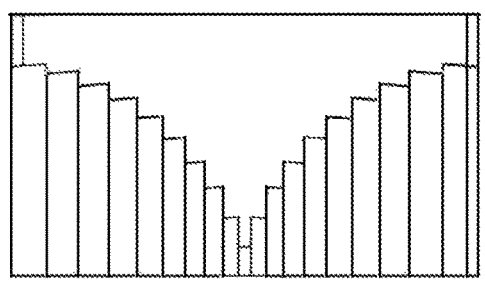
Figure 11:
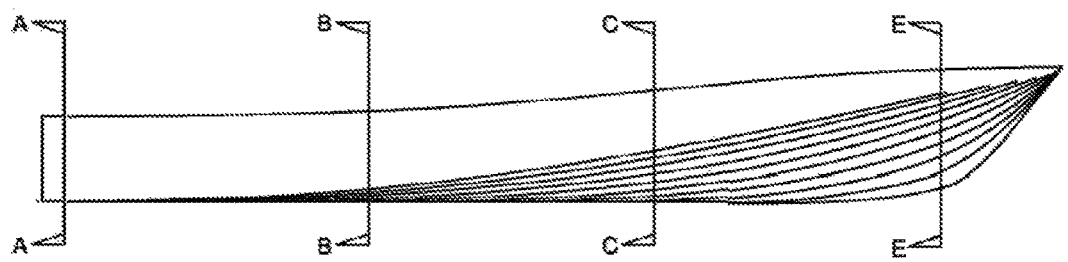
FIG. 11 is a side view of a boat hull or another embodiment.
Figure 11A:
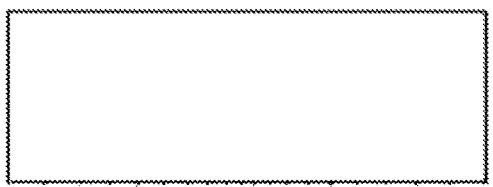
Figure 11B:
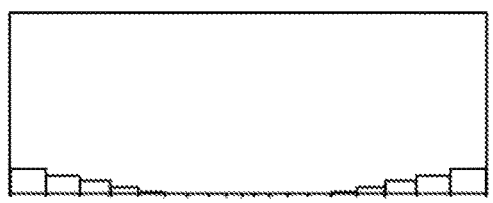
Figure 11C:
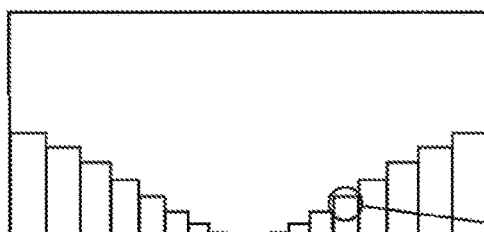
Figure 11D:
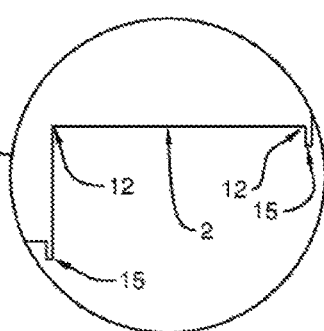
Figure 11E:
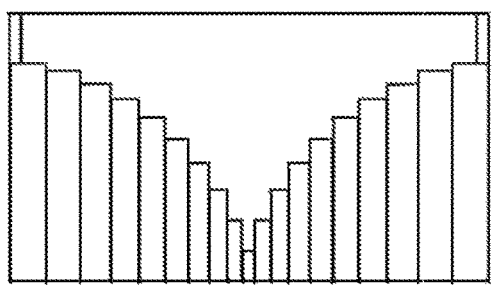

As can be seen in FIG. 9E, 10E or 11E, a lower portion of the hull 1 which is toward the bow 10 is generally V-shaped in cross section. In this regard, the chines 2 provide a "stepped" form that approximates a V shape so that the profile of the hull 1 is similar to that of a conventional V shaped hull, however, unlike conventional V hulls the configuration of hull 1 is intended to direct water downwardly and not outwardly. In this configuration, a wave incident on the hull will first contact a central chine 5, which is forward most in the portion which is toward the bow, providing a small amount of lift and minimal resistance to the hull. For progressively larger waves, adjacent chines will contact the water later, collectively providing exponential lift, reserve buoyancy and reduced resistance allowing the hull to ride over a wave without significantly affecting forward motion of the hull.

In a preferred form, at the design waterline, the hull 1 is generally pointed at bow 10 and becomes progressively wider toward the stern. This fine entry configuration reduces and accommodates slamming loads on hull 1 as it passes through a swell, yet allows the hull to provide sufficient lift for planing, suitable for carrying loads and providing lateral stability.

Owing to the above configuration, as the hull 1 moves through the water the chines 2 present a surface to the water which acts to deflect the water substantially downwardly and underneath the hull 1 to provide lift. By deflecting water downwardly, the majority of the opposing forces from the water acting on the hull 1 provide lift to the hull 1.

Figure 6:
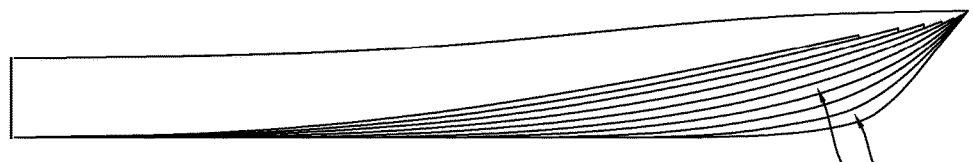
FIG. 6 is a side view of a boat hull of another embodiment, the boat hull being configured for offshore use or in heavy weather.

The chines 2 can vary in size, number and profile according to the desired application. In this regard, the width, depth and profile of the chines can vary along with the number of chines. For example, a hull configured for use in heavy swells, such as that illustrated in FIG. 6, may have a larger number of narrower chines which are larger or extend further upwardly, reducing the depth of the topsides 6 towards gunwale 25. In contrast, a hull configured for use in lighter swells may have a smaller number of wider chines that, with a flatter profile, do not extend as high up the topsides 6 of the hull 1 as shown in FIG. 7. In a preferred form, the central chine, which extends deepest into an approaching wave, is narrowest with the width of the chines increasing as they move outwardly.

As illustrated in FIGS. 10A to 10E, in another form the chines may, at least at a forward portion thereof, be inclined inwardly toward a central longitudinal plane of the hull. In such an arrangement, outward flow of water from under the hull can be limited. In this form, the chines may transition from inclined inwardly at the bow to generally horizontal at the aft end of the chine.

As illustrated in FIGS. 1 to 5, the hull 1 includes a number of features present in conventional hulls. For example, topsides 6 extend from the outer edge of the outermost chines 2 on each side of the hull 1 to the gunwale 25. A transom 8 interconnects the two topsides 6 at the stern of the hull 7.

In a preferred form, the chines 2 curve downwardly toward the flat hull underbody 4 of the hull 1. In other forms, the chines 2 may be planar and generally straight as they extend downwardly from the bow 10 to the flat underbody 4 of the hull 1. The actual contour or curvature of the chines will be selected having regard to the intended application of the hull. In this regard, a hull having chines with a small or flat contour will be more suitable for use in lighter conditions, whereas a hull with steeply curved chines will be more suitable for use in heavy swells. The forward end of the chines may be trimmed by an intersection with the inward curvature of the topsides 6 as shown in FIG. 7.

As illustrated in FIGS. 1 to 5, an aft portion or surface 4 of a base of the hull 1 is generally flat and each chine 2 terminates at the forward end 9 of the planing surface 4. As can be seen in FIG. 4, the flat aft underbody surface 4 narrows toward a forward end of the hull 1, with the central chine terminating at a location which is forwardmost compared to the location at which the outer chines terminate. As the flat surface 4 provides a relatively large planing surface to the hull 1, it can have relatively flat dynamic trim in use, increasing efficiency.

Figure 3:
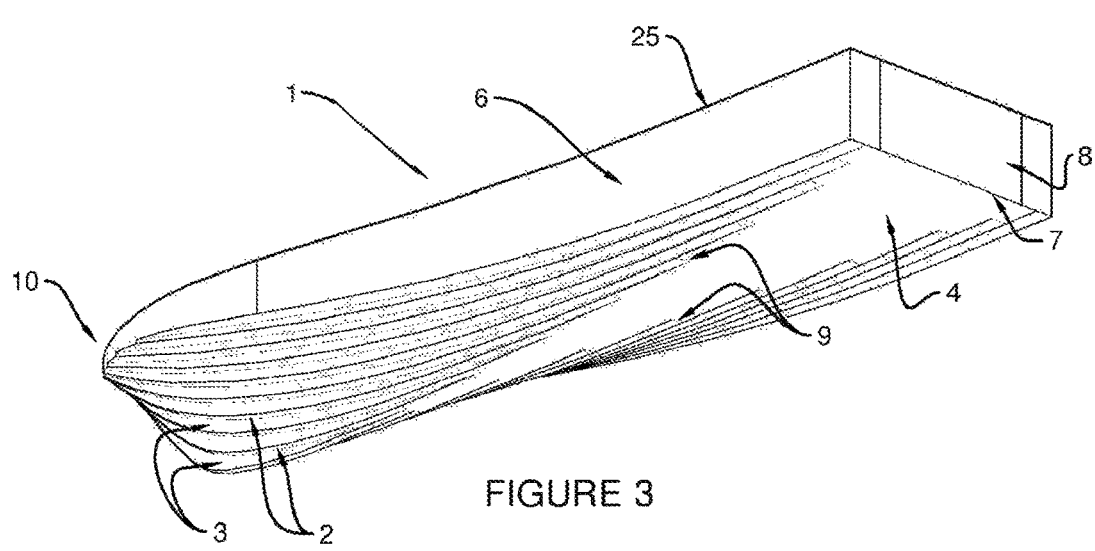
FIG. 3 is another perspective view of the boat hull of FIG. 2.

As illustrated in FIG. 3, the hull transitions into a generally rectangular transom 8 or flat underbody 4. By transitioning from a generally pointed bow 10 to a generally flat underbody 4, the hull 1 not only achieves lift and provides optimum flat aft planing surfaces to promote planing, but improves the passage of the hull 1 over and through swells. According to preferred embodiments, when compared to previous hulls, the hull 1 can also provide a more efficient hull capable of carrying a payload, with a large, dry deck area, that effectively rides over large swells while accommodating slamming loads.

Figure 8:
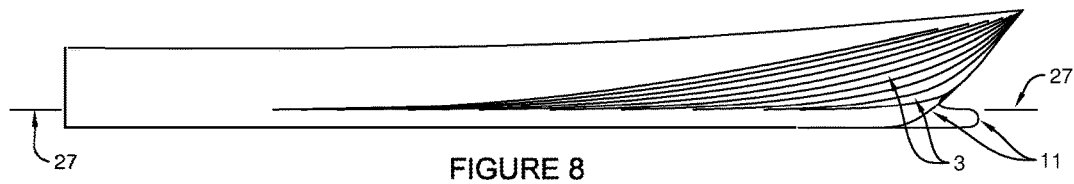
FIG. 8 is a side view of a boat hull of another embodiment, the boat hull incorporating a lower displacement section.

In the embodiment illustrated in FIG. 8, the hull 1 can be modified for use as a displacement hull, thereby allowing large loads to be carried. Such a hull can potentially be used for commercial shipping applications, while providing a dampening effect on the oscillation of the hull as it is subjected to ocean swells.

According to the embodiment illustrated in FIG. 11D, generally vertical and downwardly extending ribs 15 may be provided along the outside edges of the central or at least one pair of opposite planing chines 2 to contain and channel air against the underside of the chines 2 and flat underbody 4 to lubricate the hull. Air may be provided via a slot or hole, or simply trapped as the vessel travels over the irregular water surface. The or each rib 15 is preferably narrow with, as far as practicable, right angled internal corners 12 to minimise turbulence. The size, i.e. width and depth, of each rib 15 is selected relative to the intended area of operation and purpose of the vessel to which the hull is to be applied. The depth of the rib may vary along its length. Ribs may run the full length of the chine or start at the slot to contain air and/or gas introduced at the slot. In a preferred form, the or each rib continues along the underside of the hull towards the stern 7.

The illustrated embodiments each transition into a generally flat underbody can create skin friction drag as the hull moves through the water. To reduce frictional drag, each chine can have, near a trailing end, a device 23 for introducing air and/or gas to create an air/gas film layer, bubbles or to reduce the density of the medium in contact with the hull. In one embodiment, air or gas can flow through the aperture onto an operative surface of the chine 2 and flat hull underbody 4. In a preferred form, the aperture is substantially in the form of a slot or round hole. The slot can have a horizontal and rear facing opening providing a low pressure injection point for the air and/or gas. Preferably the pressure reduction is sufficient to excite and maintain a venturi effect. Gas injection may be assisted via a pump, blower or similar. An example of such a configuration is shown in FIGS. 12, 12A and 12B. The device is provided in at least one of the chines and can be provided in multiple or all of the chines. Secondary apertures may be provided further aft as shown in FIG. 12B to reinstate dissipated gases. The air and/or gas can flow from numerous locations ducted from above the floatation waterline, such as from an interior or exterior of the hull or from exhaust gasses from the engine. Air and/or exhaust gas may be introduced via a venturi slot or low pressure injection point via at least one aperture formed.

The illustrated embodiments of a planing type hull transition into a generally flat underbody 4, which can create drag inducing eddies as the hull moves through the water at slow or displacement speeds or a void in the water at high speeds. FIGS. 13 to 13C and 14 to 17 illustrate another embodiment of hull 1, having voids 17 in the form of cutaway sections or channels at the stern to direct water behind the hull as it moves through the water to reduce drag. The voids are inset into each side of the hull near the stern, with an upper edge starting near the design floatation waterline and extending down to marginally above flat bottom portion 19. The voids 17 extend from a location forward of the transom on the sides of the hull to and through the stern near the centreline 22. The voids 17 allow the water to fully or partially merge at the stern 22 whilst maintaining a flat planing bottom surface.

Figure 14:
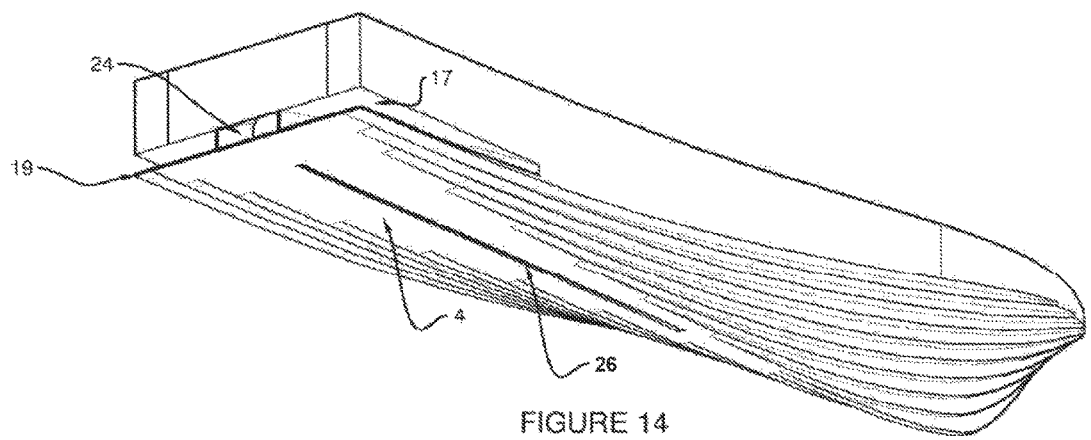
FIG. 14 is a perspective view of a boat hull of another embodiment showing an internal drive system outlet.
Figure 15:
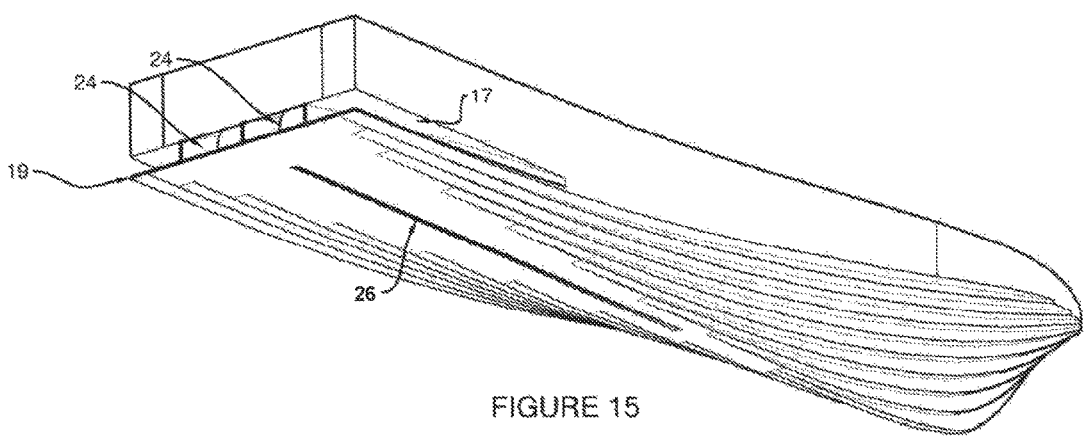
FIG. 15 is a perspective view of a boat hull of another embodiment showing outlets for twin internal drive systems.
Figure 16:
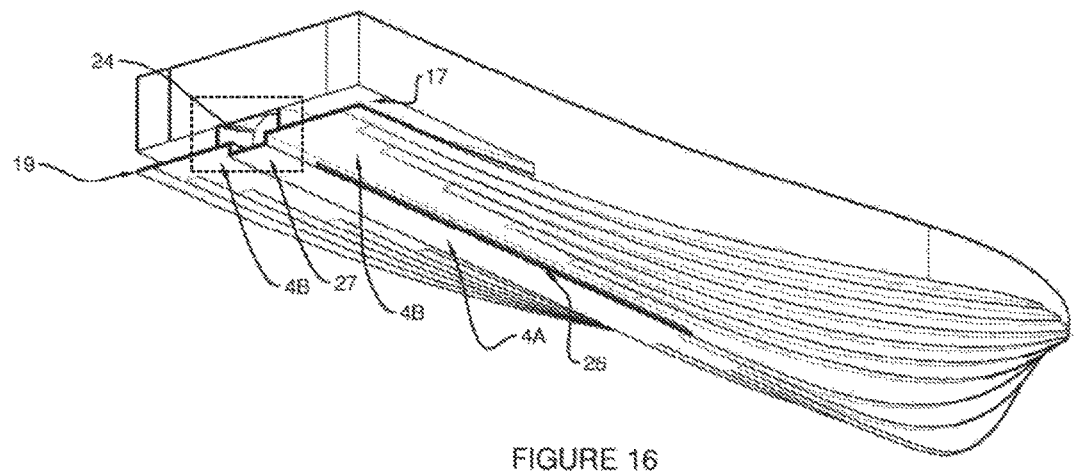
FIG. 16 is a perspective view of a boat hull of another embodiment showing the vertically disposed section.
Figure 17:
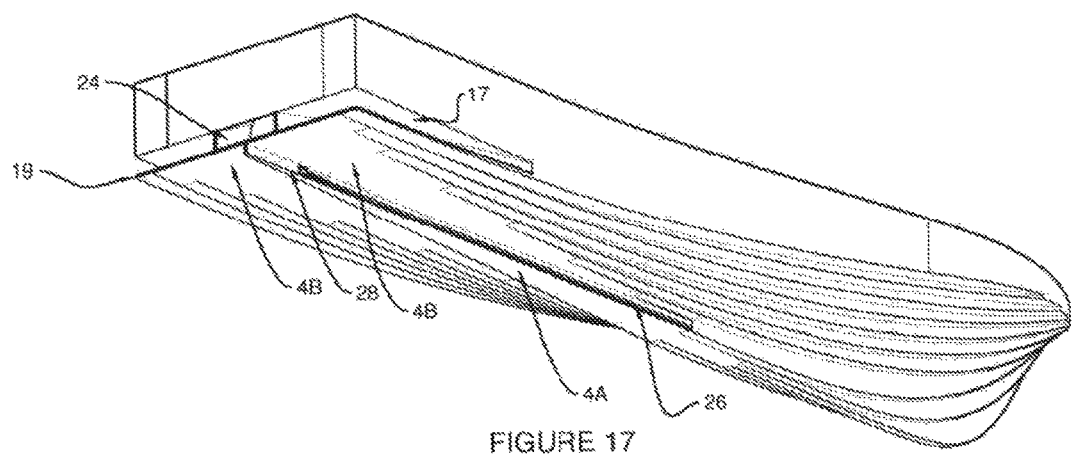
FIG. 17 is a perspective view of a boat hull of another embodiment showing the tapered vertically disposed section.
Figure 18:
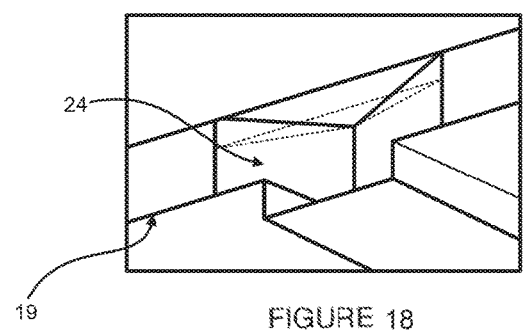
FIG. 18 is an enlarged view of the outlet of FIG. 16.

In the embodiments illustrated in FIGS. 14 to 18, an aft end or merge point 22 (refer FIGS. 13A to 13C) can accommodate an outlet 24 of an internal propulsion system for transferring displaced water from under the hull to occupy the void in the water behind the hull. FIG. 18 is an enlargement of the outlet 24 shown in FIG. 16, as indicated by the dashed line box in FIG. 16. The outlet 24 may be adjustable in size to move the water acceleration point further aft as speed increases, as indicated by the dashed line in FIG. 18. As shown in FIG. 15, the merge point may accommodate more than one drive outlet 24.

The illustrated embodiments shown in FIGS. 14 and 15 show a longitudinal water intake 26, through which displaced water is drawn from under the hull and through an internal drive system.

FIGS. 16 and 17 illustrate embodiments having a plurality of flat bottom segments 4A, 4B into which the chines 2 transition. In this regard, central chines transition into a lowermost flat bottom segment 4A and outer chines transition into flat bottom segments 4B which are disposed beside segment 4A. The lowermost flat bottom segment 4A forms part of a vertically disposed section and it will be appreciated that single or multiple chines may transition into each flat bottom segment and that additional flat bottom segments may also be provided.

The hull illustrated in FIG. 16 has a lowermost flat bottom segment 4A with a generally constant width, while the hull illustrated in FIG. 17 has vertically disposed central chines which displace water downwards at the bow providing additional lift and forward buoyancy. The flat bottom segment 4A then tapers aft of the chine in plan view to horizontally draw water displaced by the aft sections of the hull, under the hull.

The embodiments shown in FIGS. 16 and 17 include an internal propulsion system (not shown) that draws displaced water from each side of the vertically disposed section through longitudinal intakes 26 as the water is displaced. The vertically disposed section accommodates the intakes 26 to position the intakes away from the air trapped immediately under the hull. The displaced water is drawn through the internal propulsion system and deposited it into the void behind the hull through outlets 24. The vertically displaced section aft of the chines may have parallel sides in plan view as shown in FIG. 16 or be tapered in plan view as shown in FIG. 17.

The vertically displaced section of FIG. 16 is lower than the level at which outer chines terminate and provided so that the water intake for the internal propulsion system is lower in the flow path of water moving under the hull to reduce air being drawn into the internal propulsion system.

Although it is preferred that the tapered vertically displaced section of FIG. 17 be used with an internal propulsion system, it should be noted that this feature may be incorporated into a hull without an internal propulsion system.

The internal propulsion system may include propellers and/or impellers configured in an internal duct and driven by one or more engines located within the hull.

The duct includes one or more intakes 26 located under the hull through which water is drawn by the ducted propellers/impellers. The duct is also connect to an output 24 located at the stern merge point 22 of the hull where the output water is deposited into the negative pressure region behind the hull.

The propellers and/or impellers may be configured as a single propeller/impeller or in counter-rotating in-line ducted sets. At lower speeds the thrust is developed at the propeller/impeller where the differential pressure across the propeller/impeller provides the thrust. At high speed, the outlet aperture 24 of the internal drive system may be reduced in cross sectional area to move the water acceleration point from the propellers to the internal drive system outlet 24 wherein the propulsion system acts more like a water jet.

In the embodiment illustrated in FIG. 13C, a trim tab 27 can extend from a lower rearward portion of the hull and is incorporated into the aft planing surface 4. The trim tab 27 extends transverse to the water flow and rearwardly from surface 4. The trim tab is arranged to allow water to pass over the top and underside thereof to increase lift provided. Although a single trim tab 27 is shown, it may be formed of numerous individual elements. Trim tabs may be adjustable. Trim tabs may be independently adjustable to provide transverse stabilization.

The hull 1 is symmetrical about a central longitudinal plane of the hull when used for a monohull vessel, as illustrated in FIGS. 1 to 12. A pair of demi hulls 1 may also be provided for a twin hull vessel such as a catamaran, as illustrated in FIG. 13, with each hull being configured as described above. In such an embodiment, each demi hull may not be symmetrical about its central longitudinal plane, but symmetrical about a central longitudinal plane of the vessel.

The embodiments have been described by way of example only and modifications are possible within the scope of the invention disclosed. For example, the number, profile and size of the chines and their separation may be varied, as can the size of the flat portion of the base. Furthermore, the vessel may be manufactured from flat materials including metals, timbers, fibre reinforced plastics and composites.

The invention claimed is:

1. A boat hull, comprising a plurality of chines extending downwardly from a bow of the hull towards a stern of the hull, each chine in transverse cross section being substantially straight and substantially horizontal and arranged so that a centreline of each chine lies in a plane which is parallel to a plane extending through a centreline of an adjacent chine, wherein
between each chine is a generally vertical section,
a central chine sits lower and forward of adjacent chines which are disposed progressively higher and rearward toward sides of the hull, and
an aft portion of a base of the hull is generally flat and each chine terminates at the flat aft portion to provide a generally continuous transition from the chine to the flat base of the hull.

2. The boat hull as claimed in claim 1, wherein a vertical separation of the chines varies along a length of the chines to allow the chines to transition from being generally aligned at the bow through greater offset sections at mid bow to merge with a generally flat underbody and wherein a substantially vertical surface is disposed between adjacent chines.

3. The boat hull as claimed in claim 1, wherein the chines are trimmed at an intersection with a topside of the bow.

4. The boat hull as claimed in claim 1, wherein the chines curve downwardly and towards the stern.

5. The boat hull as claimed in claim 1, further comprising at least one aperture formed in at least one of the chines and through which air can flow from onto an operative surface of the chine, the aperture being disposed near a trailing end of the or each chine.

6. The boat hull as claimed in claim 1, further comprising at least one pair of generally vertical ribs extending along and downwardly from an outboard edge of opposite chines, the ribs extending along the underside of the hull towards the stern.

7. The boat hull as claimed in claim 1, further comprising a channel formed in opposite side walls of the hull at a rearward location, the channels being configured to direct water inwardly from opposite sides of the hull to merge behind the stern.

8. The boat hull as claimed in claim 7, further including a trim tab extending from a lower rearward portion of the hull.

9. The boat hull as claimed in claim 1, further comprising an internal propulsion system for transferring displaced water from under the hull to a low pressure void formed behind the hull.

10. The boat hull as claimed in claim 9, wherein the internal propulsion system includes an outlet which is adjustable in aperture size to vary a water acceleration point in response to speed changes.

11. The boat hull as claimed in claim 9, wherein the flat aft portion is formed in multiple vertically offset bottom segments and chines which are centrally disposed terminate at a lowermost bottom segment and incorporate an intake for the internal propulsion system.

12. The boat hull as claimed in claim 1, wherein the flat aft portion is formed in multiple vertically offset bottom segments and chines which are centrally disposed terminate in a lowermost bottom segment, and wherein the lowermost bottom segment tapers towards the stern.

13. The boat hull as claimed in claim 1, wherein a lower portion of the hull is in the form of a displacement hull into which the chines merge.

14. A boat, having at least one hull according to claim 1.

15. A boat hull, comprising a plurality of chines extending downwardly from a bow of the hull towards a stern of the hull, each chine being, at least at a forward portion thereof, in transverse cross section substantially straight and inclined toward a central longitudinal plane of the hull and arranged so that a centreline of each chine lies in a plane which is parallel to a plane extending through a centreline of an adjacent chine, wherein a central chine sits lower and forward of adjacent chines which are disposed progressively higher and rearward toward sides of the hull, and an aft portion of a base of the hull is generally flat and each chine terminates at the flat aft portion to provide a generally continuous transition from the chine to the flat base of the hull.

\* \* \* \* \*